US006694596B2

(12) United States Patent
Hierzer et al.

(10) Patent No.: US 6,694,596 B2
(45) Date of Patent: Feb. 24, 2004

(54) CLOSURE HAVING A LENTICULAR LENS

(75) Inventors: Valentin Hierzer, Arlington Heights, IL (US); Steve Sungsuk Kim, Santa Clara, CA (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 38 days.

(21) Appl. No.: 10/068,367

(22) Filed: Feb. 5, 2002

(65) Prior Publication Data

US 2002/0079281 A1 Jun. 27, 2002

Related U.S. Application Data

(60) Division of application No. 09/460,776, filed on Dec. 14, 1999, now Pat. No. 6,394,293, which is a continuation-in-part of application No. 09/023,539, filed on Feb. 13, 1998, now Pat. No. 6,065,623.

(51) Int. Cl.[7] .......................... G09F 3/00; B21D 39/00; B23P 11/00

(52) U.S. Cl. ........................... 29/511; 29/513; 215/230

(58) Field of Search ................................ 215/230, 228; 40/307, 311, 310, 453, 454; 206/459.5, 459.1; 29/505, 509, 513, 511; 264/249, 320, DIG. 76

(56) References Cited

U.S. PATENT DOCUMENTS 673,416 A * 5/1901 Booth ......................... 40/307
1,395,594 A 11/1921 Pfefferle
1,735,431 A 11/1929 Goertz
1,918,243 A 7/1933 Bergaud
1,975,703 A 10/1934 Vitale
2,046,745 A 7/1936 Hoag
2,055,693 A 9/1936 Lewin
2,129,406 A 9/1938 Cole
2,168,594 A 8/1939 Von Till
2,500,897 A * 3/1950 Friedman ..................... 29/511
2,997,788 A 8/1961 Gilbert
3,421,653 A 1/1969 Whaley
3,538,632 A 11/1970 Anderson
4,034,882 A 7/1977 Wright
4,111,322 A 9/1978 Obrist et al.
D249,935 S 10/1978 Williams
4,356,935 A 11/1982 Kamin
4,389,802 A 6/1983 McLaren et al.
4,408,702 A 10/1983 Horvath
4,420,527 A 12/1983 Conley
4,541,727 A 9/1985 Rosenthal
4,747,499 A 5/1988 Gach et al.
4,756,437 A 7/1988 Rossi-Mossuti
4,793,500 A 12/1988 Harding
D315,507 S 3/1991 Ochs
5,022,545 A 6/1991 Carson (List continued on next page.)

FOREIGN PATENT DOCUMENTS

FR 2045700 3/1971
GB 2130565 6/1984
GB 22 98 188 8/1996
WO WO 97/35779 10/1997

OTHER PUBLICATIONS

QDI refines focus; dimensional imaging sales takeoff, QDI, Nov./Dec. 1995.

*Primary Examiner*—Nathan J. Newhouse
(74) *Attorney, Agent, or Firm*—Woodcock Washburn LLP

(57) ABSTRACT

A closure and lenticular lens assembly that has a retaining member with a bend and a substantially horizontal, circular rim portion is disclosed. The rim portion extends annularly inward from the bend to secure the lens to a top surface of the closure. A method for forming the closure and lens assembly is also disclosed that includes placing a lenticular lens into the closure top and curling the retaining member radially inward over an edge of the lenticular lens.

29 Claims, 5 Drawing Sheets

U.S. PATENT DOCUMENTS

| | | | |
|---|---|---|---|
| D318,804 | S | 8/1991 | Ochs |
| 5,072,844 | A | 12/1991 | Nakano et al. |
| 5,113,213 | A | 5/1992 | Sandor et al. |
| 5,119,963 | A | 6/1992 | Heilman |
| 5,189,531 | A | 2/1993 | Palmer et al. |
| 5,261,547 | A | 11/1993 | Finke |
| 5,273,173 | A | 12/1993 | Debetencourt |
| 5,285,238 | A | 2/1994 | Quadracci et al. |
| D353,521 | S | 12/1994 | Booten |
| 5,400,915 | A | 3/1995 | Kennedy |
| D359,685 | S | 6/1995 | Luch |
| 5,456,375 | A | 10/1995 | May |
| 5,474,194 | A | 12/1995 | Heilman et al. |
| 5,494,445 | A | 2/1996 | Sekiguchi et al. |
| 5,497,879 | A | 3/1996 | Kao |
| 5,592,766 | A | 1/1997 | Mygatt |
| D389,062 | S | 1/1998 | Ekkert et al. |
| 5,839,592 | A | 11/1998 | Hayes |
| 5,896,686 | A | 4/1999 | Howes |
| 5,904,266 | A | 5/1999 | Tedeschi, Jr. |
| 6,065,623 | A | 5/2000 | Hierzer et al. |

* cited by examiner

CLOSURE HAVING A LENTICULAR LENS

CROSS-REFERENCE TO RELATED APPLICATIONS

This is a divisional of application Ser. No. 09/460,776 filed Dec. 14, 1999 now U.S. Pat. No. 6,394,293, which is a continuation-in part of application Ser. No. 09/023,539, filed Feb. 13, 1998 now U.S. Pat. No. 6,065,623.

FIELD OF THE INVENTION

This invention relates to a dispensing package closure, and more particularly to a dispensing package closure having a decorative addition.

BACKGROUND

Some traditional closures for dispensing packages do not enhance the image or marketability of the product and packaging because they are drab and uniform in color. Decorative inserts, such a lenticular lenses, may provide a variety of visual effects that may enhance the attractiveness of product packaging, such as providing a three dimensional appearance or multiple images as the lens is viewed at different angles. Lenticular lenses are generally have a flat sheet like shape. Examples of lenticular lens technology may be found in U.S. Pat. No. 5,285,238 (entitled, "Method for Forming a Graphic Image Web"); U.S. Pat. No. 4,420,527 (entitled, "Thermoset Relief Patterned Sheet"); and U.S. Pat. No. 5,113,213 (entitled, "Computer-generated Autostereography Method and Apparatus), each of which is incorporated herein by reference in its entirety.

Containers often contain carbonated beverages that are stored at elevated pressure (that is, higher than atmospheric pressure). The internal pressure maybe further elevated under conditions (for example) of elevated temperature or vigorous movement of the container. For example, a carbonated beverage container may be subject to elevated temperature while stored in an insufficiently cooled warehouse or during delivery, or in a hot automobile on a sunny day. Vigorous moment of the container may occur during shipping or after receipt by an end user. The elevated pressure, exacerbated by elevated temperature or movement of the contents, may cause an increase in internal pressure of the container and closure such that a flat top portion of the closure may deform from its intended flat or planar shape to a form a crowned or convex shape (as viewed from outside of the container).

Because of the deformation of closure tops, simple adhesive alone may not adequately secure a flat object to the closure top. For example, a flat decorative disk, such as a lenticular lens, may be adhesively bonded to the flat top surface of the closure. However, upon or after bottling, the closure top may tend to pull away from the periphery of the disk due to the crowning deformation of the closure top (described above). The crowning may result in failure of the adhesive and dislodging of the disk from the closure. Circumstances in which the closure undergoes several cycles of internal pressure elevation exacerbate the tendency of the disk to dislodge from the closure.

The phenomenon of closure deformation, as well as the associated problems in adhering flat objects to the deformed closure top, is not limited to carbonated beverage containers, or even to containers that are subject to elevated internal pressures. Rather, any closure that may be subject to deformation may tend to dislodge a flat disk (or similar object) from its top. Also, closures that inherently form a crowned or convex shape upon manufacture may tend to pull away from a flat disk.

The use of adhesives to adhere the flat disk to the closure top has other inherent drawbacks. Some adhesives may have a tendency to lose resiliency upon reaching elevated temperature or upon contact with moisture, which may enhance the tendency of the disk to dislodge. Further, employing certain adhesives may raise disposal, personnel protection, or recycling issues. It is a goal of the present invention to provide a closure and a decorative addition that may be secured together, as well as a method for forming or assembling the closure and decorative addition.

SUMMARY

A dispensing package closure is provided that comprises a top that has an upper surface and a lower surface; a tubular skirt that is integrally formed with the top and extends downward therefrom; a flat decorative object, such as a lenticular lens, disposed on the upper surface of the top; and a sidewall disposed on the upper surface of the top that has a bend for securing the lenticular lens to the closure. The tubular skirt is adapted to receive the neck of the dispensing package, and has a securement member formed thereon for releasably coupling the closure to the dispensing package. The securement member preferably includes threads disposed on the inner surface of the skirt.

The lenticular lens is disposed on the closure top such that its decorative face is outward. The retaining member is integrally formed with the top and skirt, and includes a base member that projects upward from the upper surface of the top. Above the base member, the retaining member forms a bend, from which a rim portion extends radially inward over a portion of the lenticular lens to secure the lens to the closure. The rim portion has a contact surface formed on its underside that may contact the outer edge of the lenticular lens.

A method for securing a decorative addition, such as a lenticular lens, to a closure for a dispensing package is also provided. The method includes the steps of a) providing a substantially flat lenticular lens; b) providing a closure having a top, a sidewall, and a tubular skirt, the top including an upper surface and a lower surface, the sidewall extending upward from the top, the tubular skirt integrally formed with the top and extending downward therefrom, the skirt adapted to receive the neck of a dispensing package; c) placing the lenticular lens on the top of the closure concentrically within the sidewall; and d) curling the sidewall radially inward to secure the lens to the closure. The sidewall may be curled from a substantially upright position to form a bend that extends to form a rim portion that secures the lenticular lens to the closure top. Preferably, the curling tool is heated to enhance bending or curling of the sidewall. The closure and lenticular lens may substantially be as described above.

DESCRIPTION OF A PREFERRED EMBODIMENT

Referring to the Figures, a dispenser package closure and lens assembly 10 according to the present invention includes a closure 12 and a lenticular lens 11. The closure assembly 10 may be employed with dispensing packages 28, such as containers used for beverages, medicines, and the like.

Figure 2:
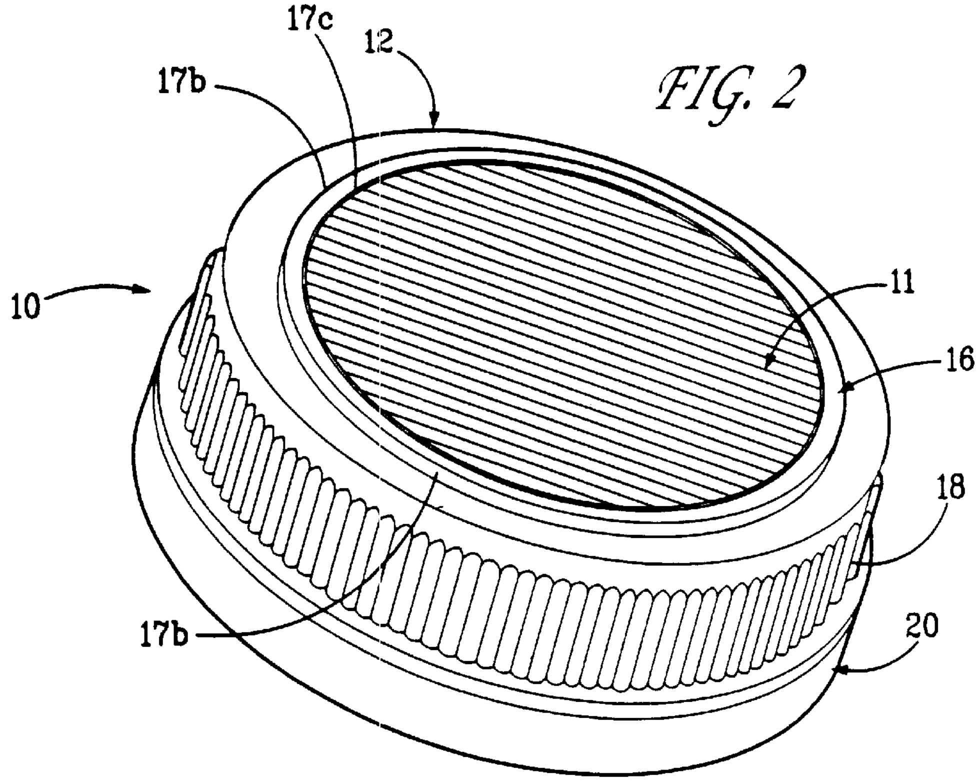
FIG. 2 is a perspective view of the closure and lens assembly of FIG. 1.
Figure 3:
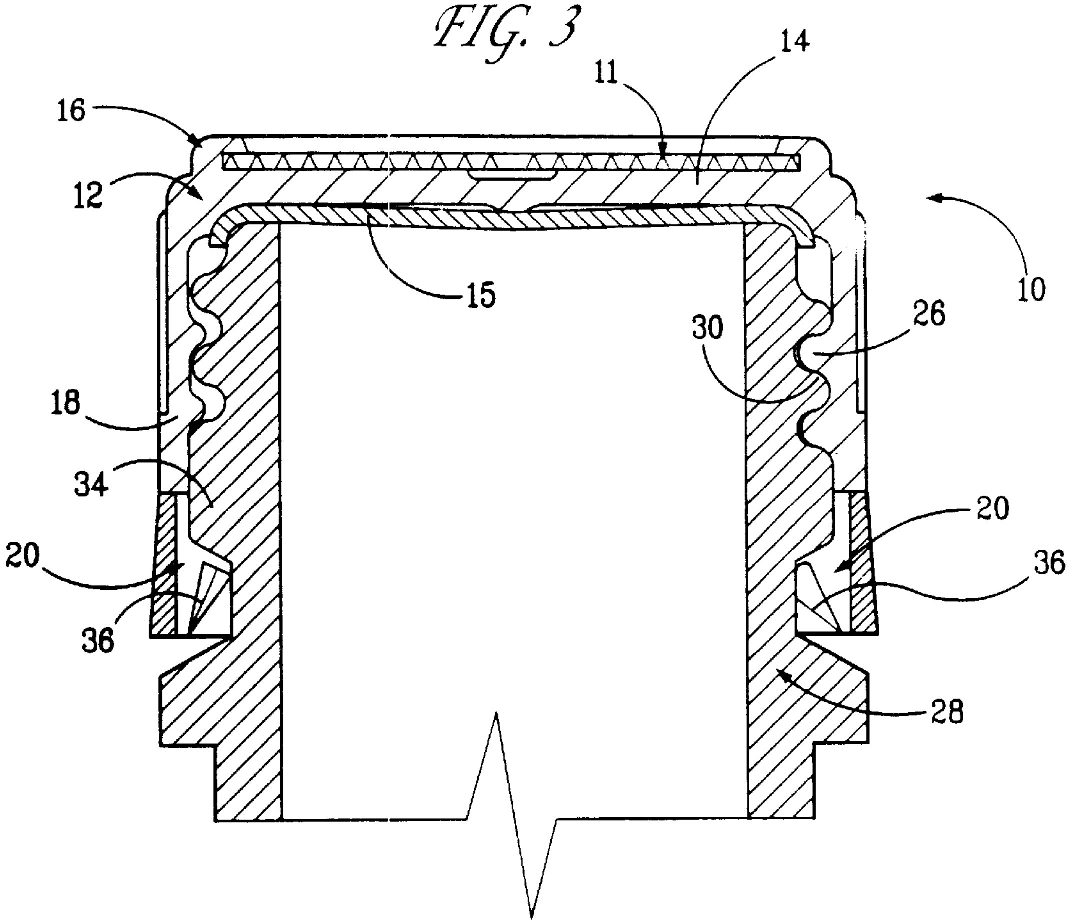
FIG. 3 is a cross sectional view of the closure portion of FIG. 1 after it has been applied to a container package.
Figure 4:
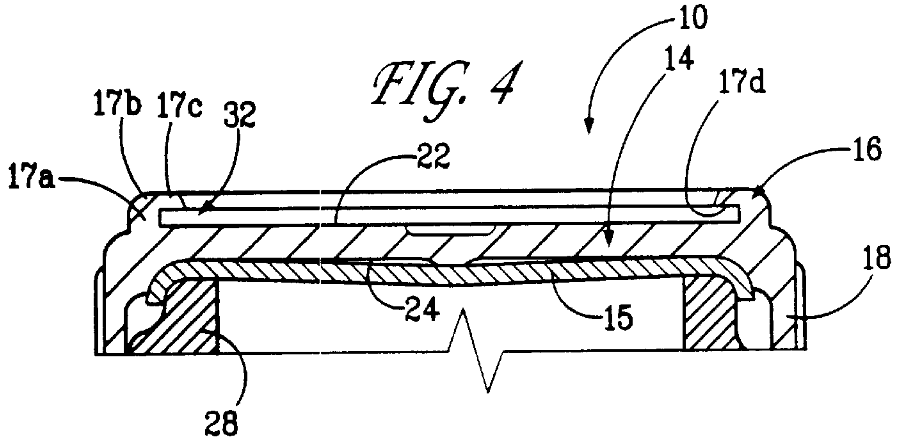
FIG. 4 is an enlarged cross sectional view of a portion of the closure of FIG. 1.

Referring particularly to FIGS. 1, 2, 3, and FIG. 4 (from which lenticular lens 11 is removed for clarity), closure 12 includes a closure top 14, a liner 15, a retaining member 16, a tubular skirt 18, and a tamper evident ring 20. As best shown in FIG. 4, closure top 14 has an upper surface 22 and an opposing lower surface 24, from which tubular skirt depends downward. Preferably, the top 14, retaining member 16, tubular skirt 18, and tamper evident ring 20 are formed from a single piece of plastic, such as polypropylene, by injection molding, although other materials and processes are possible. Liner 15 is disposed on the face of lower surface 24.

Figure 1:
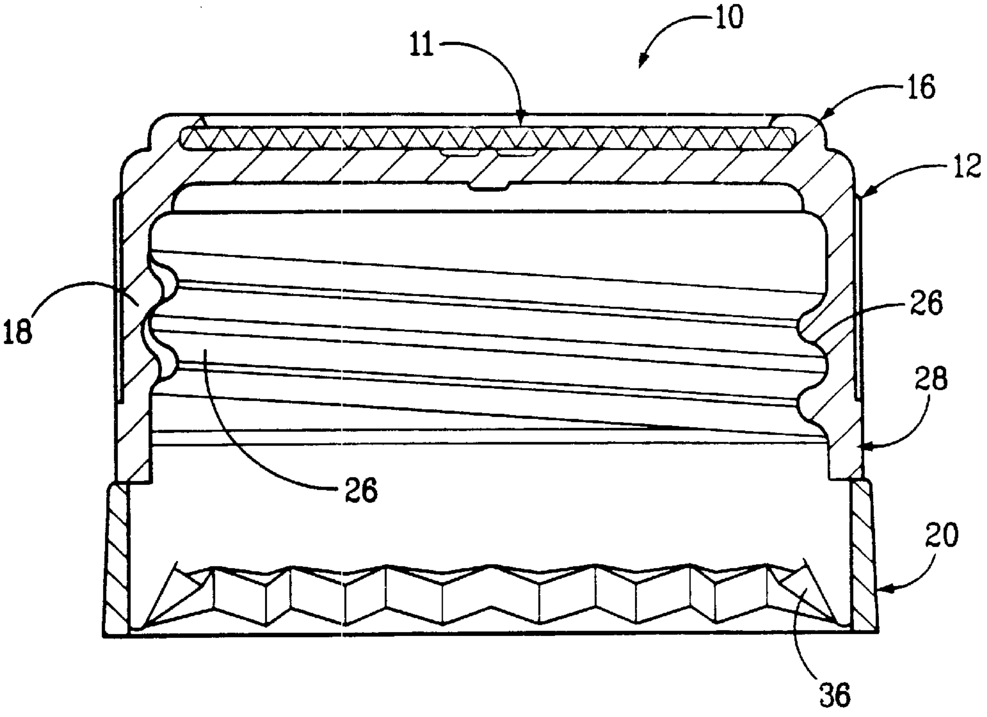
FIG. 1 is a cross sectional view of closure and lens assembly according to the present invention.

Retaining member 16 rises upward from upper face 22, and forms and overall circular shape as shown in FIG. 2. Preferably, retaining member 16 is formed near the outer periphery of closure 12, but may be spaced apart from the outer periphery to accommodate a lenticular lens of a smaller diameter than that shown in the Figures. Retaining member 16 preferably forms a continuous member, as shown in the Figures, although the present invention also encompasses the retaining member 16 forming other shapes that correspond to lens of shapes other than as shown in FIG. 1. For example, retaining member 16 may form a square, rectangular, or oval shape to correspond to a respectively shaped lens (not shown). Further, the retaining member may be discontinuous to form, for example, plural arcuate members (not shown) that may be disposed at the perimeter of a circular lens 11.

Figure 5A:
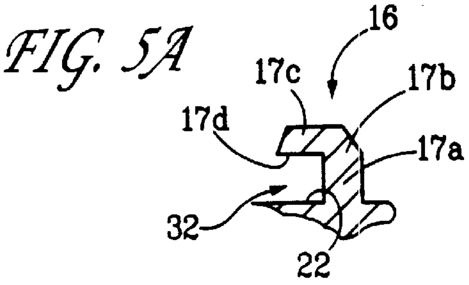
FIG. 5A is an enlarged view of a portion of FIG. 4.

As best shown in FIG. 5A, retaining member 16 preferably includes a base member **17*a*, a bend 17*b*, and a rim portion 17*c* that are integrally formed. Base member 17*a* extends upward from upper surface 22, and is preferably substantially perpendicular thereto on both the inboard and outboard side of base member 17*a*. Base member 17*a* yields to bend 17*b*, which extends radially inward to form rim portion 17*c* at its distal end. Preferably the inboard surface of base member 17*a* and rim portion 17*c* form an annular cavity 32 with upper surface 22, as shown in FIG. 4. The circumferential edge of lens 11 is disposed in cavity 32. Rim portion 17*c* has a contact surface 17*d* formed on its lower surface that contacts the edge of lens 11 to secure lens 11 against top surface 22, as shown in FIGS. 1 and 3**.

Figure 5B:
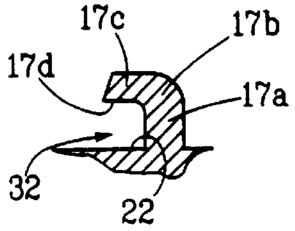
FIG. 5B is an enlarged view of another embodiment of the portion of FIG. 4.

FIG. 5A shows retaining member 16 forming a sharp transition on its inboard (that is, facing radially inward or toward upper surface 22) surface such that the inboard surface of base member **17*a* and the inboard surface of rim portion 17*c* substantially form a right angle. The outboard portion of retaining member 16 forms an annular chamfer or bevel between the outboard surfaces of base member 17*a* and rim portion 17*c*. FIG. 5B shows another embodiment of retaining member 16 that has a gradually arcuate transition on both its inboard and outboard surfaces. The inboard and outboard rectilinear surfaces of base member 17*a* and rim portion 17*c*, respectively, may be perpendicular. Alternatively, base member 17*a* may smoothly yield to rim portion 17*c* such that both the inboard and outboard surfaces of retaining member 16** are continuously arcuate and lack rectilinear sides.

Figure 9:
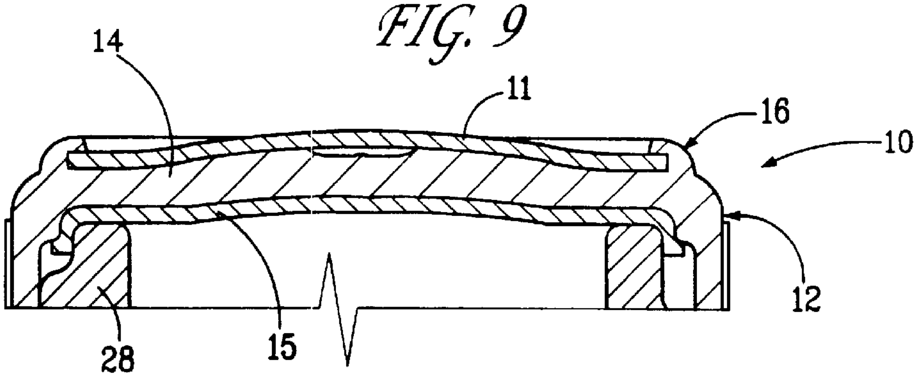
FIG. 9 is enlarged view of a portion of the assembly of FIG. 1 deformed by elevated internal pressure.

Assembly 10 preferably secures lens 11 to closure 12 without using adhesives. Securing lens 11 between contact surface **17*d* of retaining member 16 and upper surface 22 of top 14, as described herein, may prevent dislodging of lens 11 from closure 12, especially in circumstances in which closure 12 is deformed, such as conditions of elevated internal pressure within dispensing package 28. For example, FIG. 9 shows dispensing package and lens assembly 10 in a deformed state due to elevated internal pressure. Specifically, lens 11 may have been secured to closure 12 while top 14 was flat (as shown in FIG. 1). Assembly 10 may have been deformed upon filling and pressurizing of dispensing package 28. The pressure within the dispensing package 28 urges against liner 15 and lower surface 24 of top 14 to form a crown or convex shape. The present invention has an advantage of securing the tens 11 and closure 12 together at the edge of the lens 11 even while closure 12 has the crown shape shown in FIG. 9**.

Referring again to FIGS. 1 through 4, the tubular skirt 18 extends downward from the lower surface 24 of top 14, and is sized to receive and seal the neck of the dispensing package 28. Preferably, skirt 18 has a set of threads 26 that engage a set of matching threads 30 disposed on the outer surface of the neck of dispensing package 28, as best shown in FIG. 1.

Figure 7:
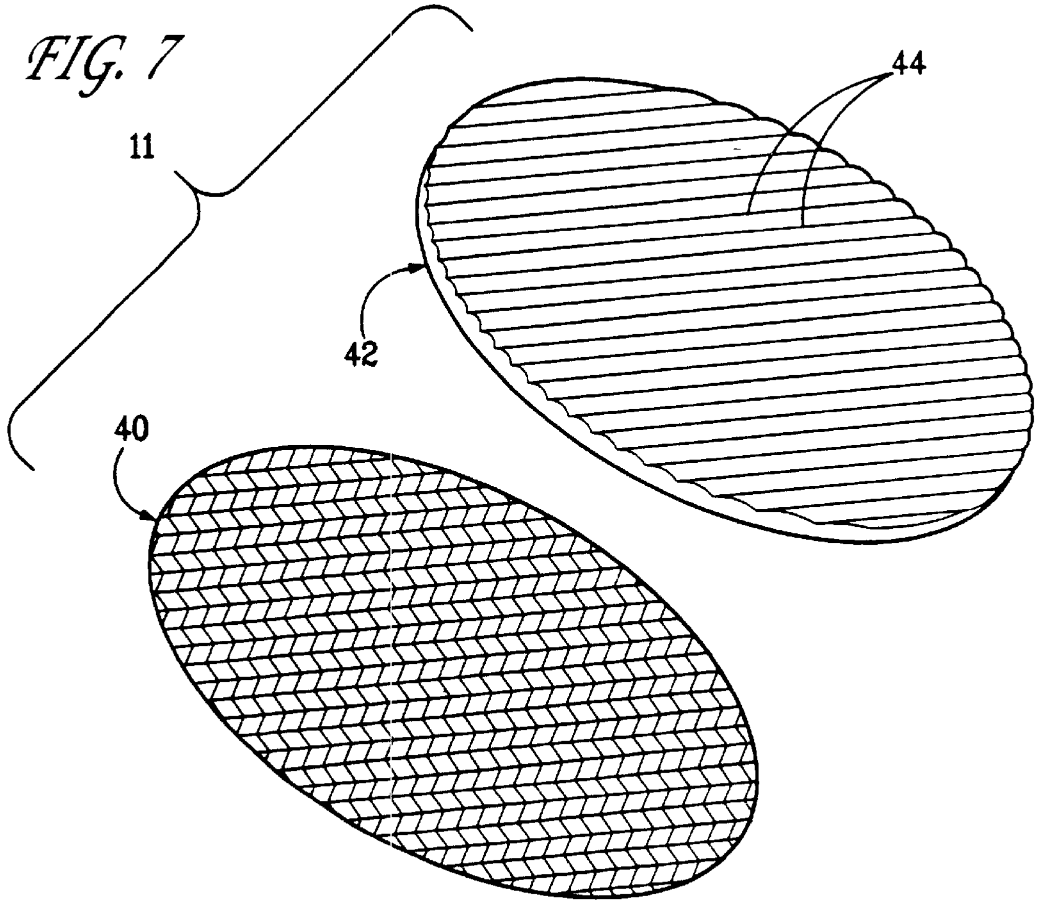
FIG. 7 is an exploded view of components of the lenticular lens.

Referring to FIG. 7, lenticular lens 11 is composed of at least two alternately interleaved images forming a base image file 40 and an optical coating 42. The interleaving process is preferably preformed on a computer with commercially available image editing soft ware, however, interleaving can also be accomplished by a manul means during or after the creation of the individual images. Lens 11 has a preferred diameter of 24 mm (0.94 inches) and a preferred thickness of either 0.030 inches (0.76 mm) or 0.017 inches (0.43 mm). However, the present invention encompasses lenses of any dimensions, as well as other objects that have a flat edge suitable for securing by rim portion **17*c***.

The optical coating 42 is preferably formed from a substantially transparent thermosetting polymer. The polymer optical coating 42 forms a non-planar surface defining a series of elongated parallel lenticular formations of narrow width and substantially uniform size and shape, forming parallel lenses 44. These parallel lenses 44 have a predetermined focal length correlated with the thickness of the polymer coating so as to focus substantially at the surface of the base image film 40. The resulting base image film 40 and polymer coating 42 form the composite lenticular lens 11 that provides a desired three-dimensional image, moving image, or multiple image visual effect.

The preferred embodiment also includes the tamper evident ring 20, which circumferentially engages and frangibly connects to the open end of the tubular skirt 18. The inner surface of tamper evident ring 20 contains a flange 36, which when placed on the dispensing package 28, hooks under a lug 34 (as shown in FIG. 1) on the neck of dispensing package 28. Tamper evident ring 20 has sufficient resilience and elasticity so that flange 36 having a diameter slightly smaller than the diameter of lug 34 can be formed over the lug 34.

The frangible connection can withstand the compression forces during application of the closure to the dispensing package 28 but yields under tension upon removal. In this respect, when the closure 12 is removed from the package, the force required to pull flange 36 over lug 34 is greater than the force required to break the frangible connection. Accordingly, as the closure 12 is removed, the frangible connection breaks, separating tamper evident ring 20 from the remainder of closure 12. The tamper evident ring 20 remains on the neck of the dispensing package 28 to indicate that the original seal has been broken.

Figure 10:
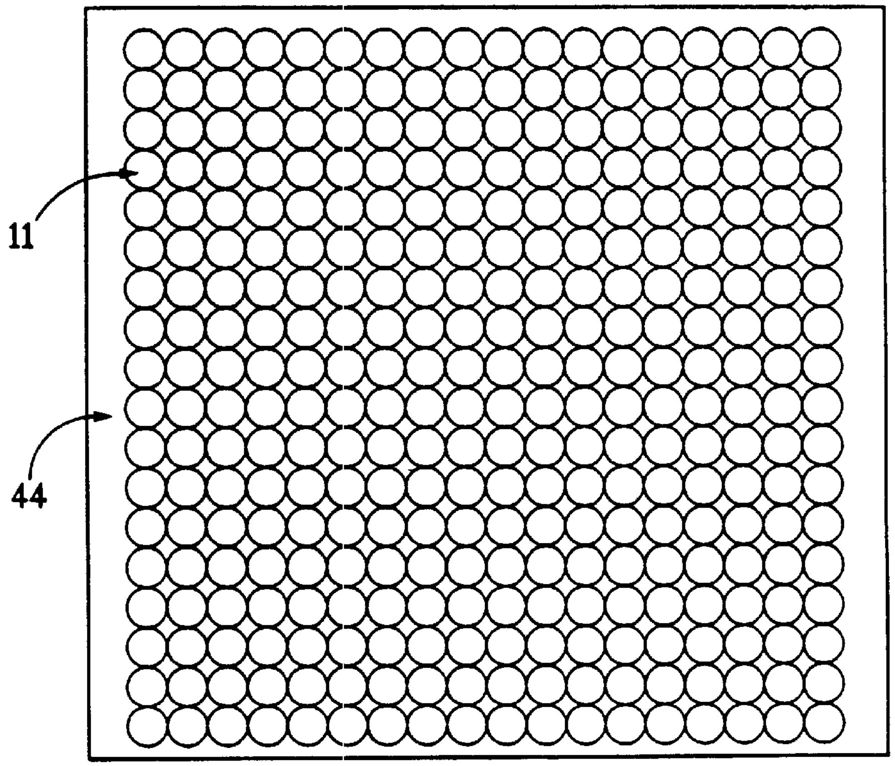
FIG. 10 is a view of a sheet of lenticular lenses.

According to another aspect of the present invention, a method for securing a decorative addition, such as lenticular lens 11, to a dispensing package closure is provided. The closure is preferably closure 12 as described above. Lenticular lens 11 preferably is die cut from a flat sheet 44. Preferably, flat sheet 44 includes a grid of images, such as the 18 by 18 grid shown in FIG. 10. For manufacturing case, each uncut image on flat sheet 44 maybe larger than the finish lens 11. For example, each uncut image has a preferred diameter of 30 mm (1.18 inches), and the die (not shown) cuts a 24 mm (0.94 inch) diameter lens 11 that is insertable within retaining member 16.

Figure 6:
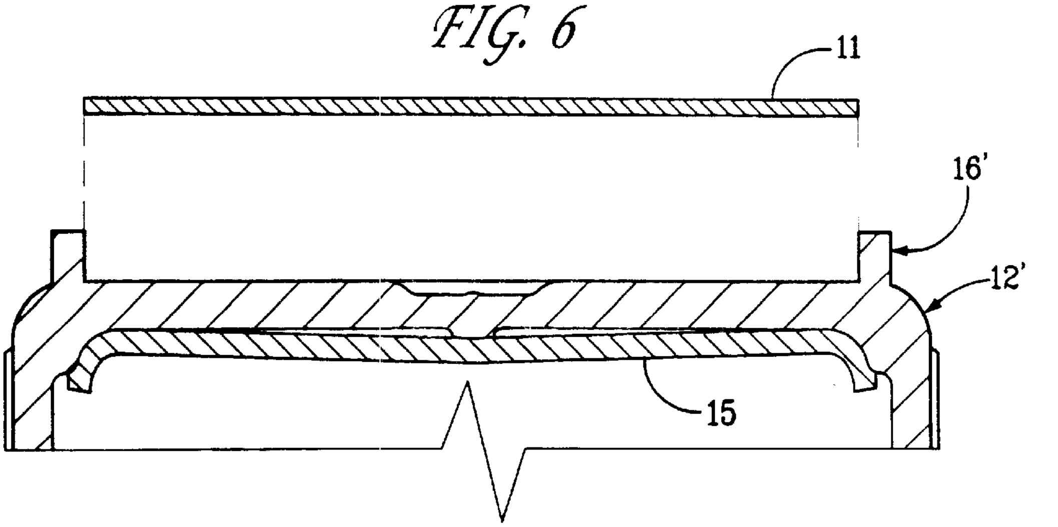
FIG. 6 is an exploded view of the closure and lens components of FIG. 1 before assembly.

Referring to FIG. 6, lenticular lens 11 may be placed on an undeformed closure 12' (that is, a closure before the retaining member is bent or curled over an edge of the lens 11). Closure 12' has a retaining wall 16' that preferably forms a cylindrical shape disposed on top of upper surface 22. Specifically, retaining wall 16' preferably has an inboard surface that is substantially perpendicular to upper surface 22. The inside diameter of wall 16' matches the outside diameter of lenticular lens 11, such that lens 11 may be easily inserted within sidewall 16' to rest on upper surface 22. The outboard surface of retaining wall 16' may also be perpendicular to upper surface 22.

Figure 11:
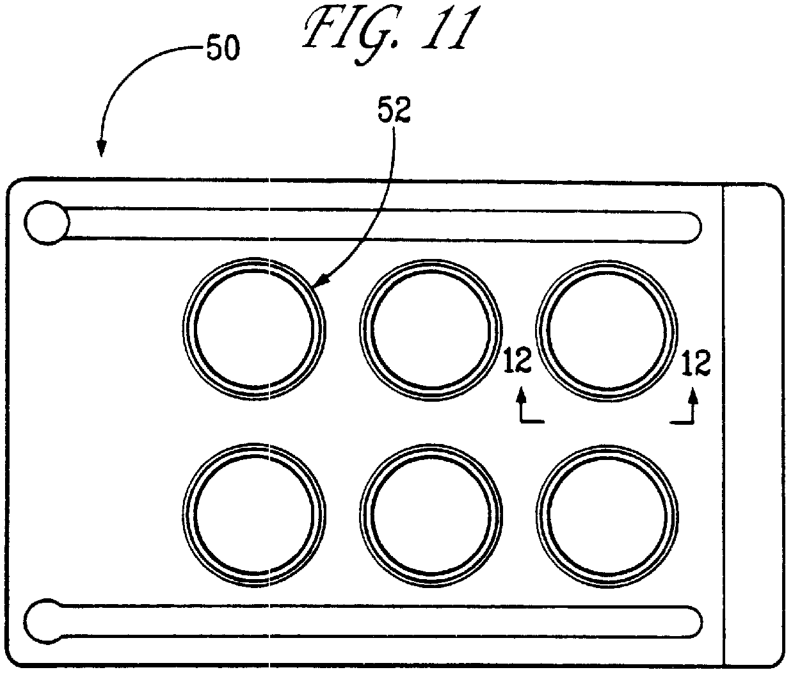
FIG. 11 is a view of closure and lens assembly tooling that may be employed during the process of forming the assembly of FIG. 1.
Figure 12:
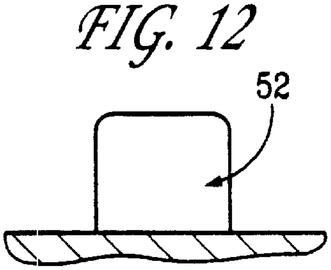
FIG. 12 is a view of a portion of FIG. 11 taken through line 12—12.

Closure 12' may be mounted onto a pedestal to steady and hold closure 16' during subsequent manufacturing steps. Lens 11 may be inserted onto upper surface 22 before closure 12' is inserted the pedestal, or closure 12' may be placed on its assembly pedestal before lens 11 is placed within sidewall 16'. FIGS. 11 and 12 show an assembly tool 50 that includes six pedestals 52 that may be used to hold closure 12'. Preferably, pedestal 52 has a shape that engages the interior of closure 12 such that closure 12' may be firmly mounted onto pedestal 52. Closure 12' may be mounted onto pedestal 52 by hand or by an automated machine process, as will be clear to persons familiar with such machinery and processes.

Figure 8A:
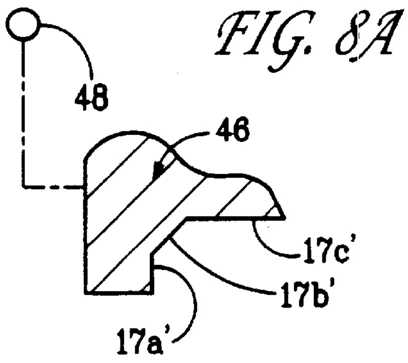
FIG. 8A is a view of a portion of a tool that may be employed to form the assembly of FIG. 1.
Figure 13:
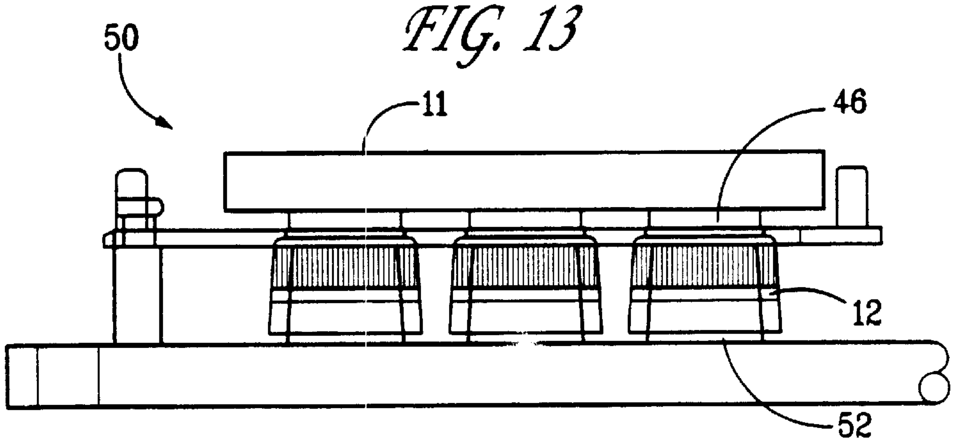
FIG. 13 is a side view of the assembly tooling of FIG. 11 in contact with the assembly of FIG. 1.

After lens 11 is disposed within sidewall 16', a heated curling tool 46 is urged against sidewall 16' to form bend **17*b*. As shown in FIG. 8A, curling tool 46 includes a substantially vertical, circular base surface 17*a'*, a substantially horizontal outer rim surface 17*c'*, and an angled surface 17*b* ' therebetween. Surfaces 17*a'*, 17*b'*, and 17*c* ' correspond to member portions 17*a*, 17*b*, and 17*c*, respectively. Curling tool 46 is heated by a heating system 48 such that contact with sidewall 16' forms bend 17*b*, and rim portion 17*c* of retaining member 16, as will be understood by persons familiar with such plastic deforming processes. FIG. 13 shows curling tool 46 in contact with closure 12**.

Figure 8B:
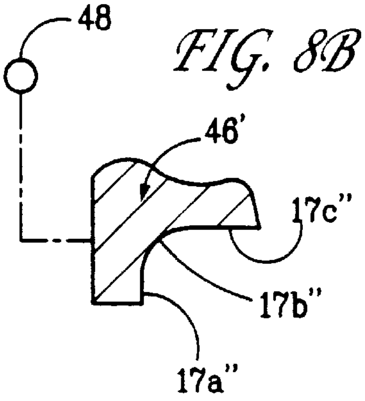
FIG. 8B is a view of a portion of another tool that may be employed to form the assembly of FIG. 1.

FIG. 8B shows another curling tool 46' that has a substantially vertical, circular base surface **17*a''*, a substantially horizontal outer rim surface 17*c''*, and a smoothly curved surface 17*b* ' therebetween. Curling tool 46' may be used to form a shape of retaining member 16 as generally shown in FIG. 5B. Preferably, sidewall 16' is curled by curling tool 46 (or 46') until contact surface 17*d* contacts the outer face of lenticular lens 11 to securely fasten the lens to the closure 12. Curling tool 46 (or 46') may be raised away from closure 12, and the substantially finished closure and lens assembly 10 may be removed from the pedestal 52 either by hand or by an automated process. Preferably, a curling tool 46 (or 46') will be disposed above each of the pedestals 52 such that multiple retaining walls 16'** may be curled with each downward stroke of the tooling.

Closure and lens assembly 10 may include the advantages of, for example, securely urging the lens 11 into contact with the closure top 14, thereby preventing shifting or pivoting of the lens 11 with respect to the closure 12. Alternatively, the present invention encompasses loosely securing the lens 11 such that contact surface **17*d* of the retaining member 16 may lightly contact lens 11, or such that contact surface 17*d* is spaced apart from the upper surface of lens 11 while the lens is disposed on closure top 14. Loosely securing the lens 11 to the closure 12 may enable twisting of lens 11 relative to closure 12. The present invention encompasses lens 11 that are removable from closure 12**.

The present invention may be embodied in other specific forms without departing from the spirit or essential attributes thereof. For example, although a lenticular lens is described, the present invention encompasses employing similar decorative objects, flat objects, disks and the like in place of, or in addition to a lenticular lens. Further, although lack of adhesive is an advantage of the present invention, adhesives may be employed to augment securing the lens 11 within cavity 32 formed by retaining member 16. Accordingly, reference should be made to the appended claims, rather than to the foregoing specification, as indicating the scope of the invention.

We claim:

1. A method for securing a lenticular lens to a closure for a dispensing package, comprising the steps of:

a) providing a substantially flat lenticular lens;

b) providing a closure having a top, a sidewall, and a tubular skirt, the top including an upper surface and a lower surface, the sidewall extending upward from the top, the tubular skirt integrally formed with the top and extending downward therefrom, the skirt adapted to receive the neck of a dispensing package;

c) placing the closure onto a post;

d) placing the lenticular lens on the top of the closure concentrically within the sidewall; and e) moving a heated curling tool against the sidewall to curl the sidewall radially inward to secure the lens to the closure.

2. The method of claim 1 wherein step d) includes curling the sidewall to contact an outer face of the lens to secure the lens to the closure.

3. The method of claim 1 wherein step a) includes cutting the lens from a flat sheet having other lenses formed thereon.

4. The method of claim 1 wherein step d) includes curling the sidewall to lightly contact an outer face of the lens to secure the lens to the closure.

5. The method of claim 1 wherein step d) includes curling the sidewall to a position wherein an edge portion of the lens is spaced apart from an underside of the sidewall.

6. A method for securing a decorative insert to a closure for a dispensing package, comprising the steps of:

a) providing the decorative insert;

b) providing the plastic closure having a top, a sidewall projecting upwardly from the top, and a tubular skirt depending downwardly from the top, the top including an upper surface and a lower surface, the skirt adapted to receive the finish of a dispensing package;

c) placing the insert on the top of the closure within the sidewall; and d) applying a heated tool to the sidewall to deform the sidewall radially inwardly to a position ranging from a contact surface of the sidewall being spaced apart from the decorative insert to the contact surface lightly contacting the decorative insert, thereby securing the insert to the closure.

7. The method of claim 6 wherein the deforming step d) includes curling the sidewall to lightly contact an outer face of the insert to secure the insert to the closure.

8. The method of claim 6 wherein the deforming step d) includes curling the sidewall such a portion of the sidewall is substantially horizontal.

9. The method of claim 6 wherein the deforming step d) includes curling the sidewall to form an annular cavity such that an edge portion of the insert projects into the annular cavity.

10. The method of claim 9 wherein the edge portion of the insert is spaced apart from an underside of sidewall.

11. The method of claim 6 further comprising the step of stamping the decorative insert from a sheet to form the decorative insert.

12. The method of claim 6 wherein the disk is substantially flat and the upper surface of the closure top is substantially flat upon molding.

13. The method of claim 6 wherein the sidewall is circumferentially discontinuous.

14. The method of claim 6 wherein the decorative insert has a disk shape.

15. The method of claim 14 wherein the decorative insert is a lenticular lens.

16. The method of claim 6 wherein the deforming step d) includes moving a heated curling tool downward against the sidewall.

17. The method of claim 16 further comprising the step of placing the closure onto a post that is aligned with the curling tool prior to the deforming step d).

18. A method for securing a decorative disk to a closure for a dispensing package, comprising the steps of:

a) providing a plastic closure having a top, a sidewall projecting upwardly from the top, and a tubular skirt depending downwardly from the top, the top including a substantially flat upper surface and a lower surface, the skirt adapted to receive the finish of a dispensing package;

b) placing the disk on the upper surface of the plastic closure within the sidewall; and c) heating and deforming the sidewall radially inwardly to form an annular cavity such that an edge portion of the insert projects into the annular cavity, and wherein the edge portion of the insert is spaced apart from an underside of the sidewall;

whereby the disk is secured to the plastic closure upon crowning of the closure top.

19. The method of claim 18 wherein the heating and deforming step c) includes curling the sidewall such a portion of the sidewall is substantially horizontal.

20. The method of claim 18 further comprising the step of stamping the decorative insert from a sheet to form the decorative insert.

21. The method of claim 18 wherein the disk is substantially flat and the upper surface of the closure top is substantially flat upon molding.

22. The method of claim 18 wherein the sidewall is circumferentially discontinuous.

23. The method of claim 18 wherein the decorative insert has a disk shape.

24. The method of claim 23 wherein the decorative insert is a lenticular lens.

25. The method of claim 18 wherein the heating and deforming step c) includes moving a heated curling tool downward against the sidewall.

26. The method of claim 25 further comprising the step of placing the closure onto a post that is aligned with the curling tool prior to the heating and deforming step c).

27. A method for securing a decorative insert to a closure for a dispensing package, comprising the steps of:

a) providing the decorative insert;

b) providing the plastic closure having a top, a sidewall projecting upwardly from the top, and a tubular skirt depending downwardly from the top, the top including an upper surface and a lower surface, the skirt adapted to receive the finish of a dispensing package;

c) placing the plastic closure onto a pedestal;

d) placing the insert on the top of the closure within the sidewall; and e) moving a heated tool against the sidewall to deform the sidewall radially inwardly to secure the insert to the closure.

28. The method of claim 27, wherein the insert is loosely secured to the closure.

29. The method of claim 27, wherein the step of e) includes deforming the sidewall to lightly contact an outer face of the insert.

* * * * *